United States Patent [19]
Cobb et al.

[11] Patent Number: 5,956,506
[45] Date of Patent: Sep. 21, 1999

[54] SYSTEM AND METHOD FOR FUNCTIONALLY ENHANCING PROCEDURAL SOFTWARE USING OBJECTS

[75] Inventors: Edward Ellis Cobb, Saratoga, Calif.; Thomas James Freund, Winchester, United Kingdom; Simon Anthony James Holdsworth, Andover, United Kingdom; Iain Stuart Caldwell Houston, Bradford Abbas, United Kingdom; Stanley Alan Smith, Austin, Tex.

[73] Assignee: International Business Machines Corporation, Armonk, N.Y.

[21] Appl. No.: 08/841,000

[22] Filed: Apr. 22, 1997

Related U.S. Application Data

[63] Continuation of application No. 08/357,836, Dec. 16, 1994, abandoned.

[51] Int. Cl.[6] ............................................. G06F 9/40
[52] U.S. Cl. .................................... 395/671; 395/682
[58] Field of Search ................................ 395/682, 671; 707/1, 2, 3, 4

[56] References Cited

U.S. PATENT DOCUMENTS

| | | | |
|---|---|---|---|
| 4,558,413 | 12/1985 | Schmidt et al. | 707/203 |
| 5,155,837 | 10/1992 | Liu et al. | 395/200.51 |
| 5,297,279 | 3/1994 | Bannon et al. | 707/103 |
| 5,329,626 | 10/1990 | Klein et al. | 395/200.78 |
| 5,339,435 | 8/1994 | Lubkin et al. | 395/712 |
| 5,379,432 | 1/1995 | Orton et al. | 395/683 |
| 5,557,798 | 12/1990 | Skeen et al. | 705/35 |
| 5,574,915 | 12/1993 | Lemon et al. | 395/561 |

OTHER PUBLICATIONS

Lindsay, Robert, "Hints for VisualAge Wrappers", OS/2 Magazine, pp(8) Sep. 1994.

Orfali et al. "Essential Client/Server Survival Guide", Van Nostrand Reinhold, pp. 244–260, 1994.

*Primary Examiner*—Alvin Oberley
*Assistant Examiner*—St. John Courtenay, III
*Attorney, Agent, or Firm*—Mark S. Walker

[57] ABSTRACT

A system and process for enhancing procedural software using object oriented classes. Implementation classes are constructed that provide a defined object oriented interface to applications and are able to invoke the procedural software using defined procedural application program interfaces (APIs). New function is added to the software by adding classes that interface to the implementation classes or directly to the procedural API. The new function builds upon the procedural software without accessing the procedural software source code or modifying that source code.

12 Claims, 7 Drawing Sheets

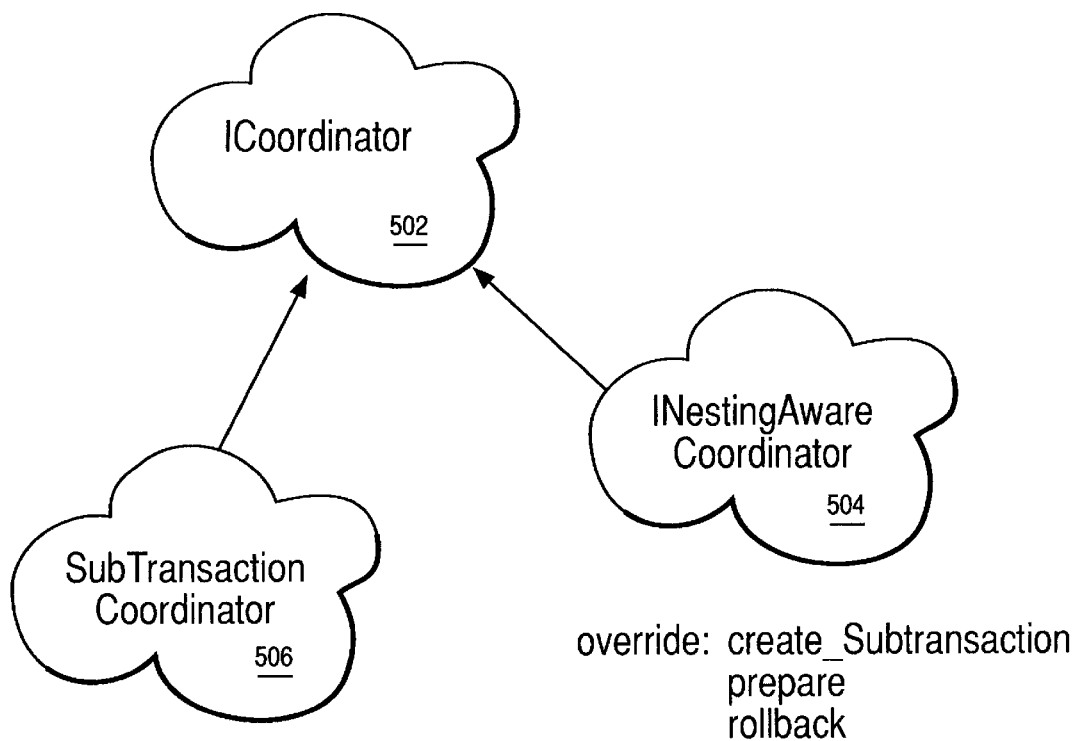

FIG. 8

```
A ──────────────────────────────────────────── A
   //#        ICoordinator::remove_child
   //#        ICoordinator::reply_action
   //#        ICoordinator::prepare
   //#        ICoordinator::commit
   //#        ICoordinator::rollback
   //#        ICoordinator::register_synchronization
   //#        ICoordinator::before_completion
   //#        ICoordinator::after_completion
   //#        ICoordinator::set_permanent
   //#        ICoordinator::set_terminator
      };
```

FIG. 10B

```
interface SubCoordinator :  INestingAware Coordinator
                            ICoordinator
{
    void SubCoordinator_initialise   ( in OMGtid parent_global_id,
                                       in InternalTid parent_local_id,
                                       in TransAncestry ancestors,
                                       out pOMGtid child_global_id );
    void SubCoordinator_subordinate ( in OMGtid global_id,
                                       in Coordinator superior,
                                       in boolean temporary,
                                       in TransAncestry ancestors,
                                       out InternalTid local_id );
    void SubCoordinator_construct    ( in InternalTid local_id,
                                       in pOMGtid global_id,
                                       in TransAncestry ancestors );

//# overrides:   Coordinator: :get_status
//#              Coordinator: :get_parent_status
//#              Coordinator: :get_top_level_status
//#              Coordinator: :is_same_transaction
//#              Coordinator: :is_related_transaction
//#              Coordinator: :is_ancestor_transaction
//#              Coordinator: :is_descendant_transaction
//#              Coordinator: :is_top_level_transaction
//#              Coordinator: :hash_transaction
//#              Coordinator: :hash_top_level_tran
//#              Coordinator: :register_resource
//#              Coordinator: :register_subtran_aware
//#              Coordinator: :rollback_only
//#              Coordinator: :get_transaction_name
//#              Coordinator: :create_subtransaction
//#              ICoordinator: : get_global_id
//#              ICoordinator: : get_local_id
//#              ICoordinator: : get_ancestors
//#              ICoordinator: : add_child
```

FIG. 10A

SYSTEM AND METHOD FOR FUNCTIONALLY ENHANCING PROCEDURAL SOFTWARE USING OBJECTS

This is a continuation of application Ser. No. 08/357,836 filed Dec. 16, 1994, now abandoned.

CROSS-REFERENCE TO RELATED APPLICATIONS

The present application is related to the application entitled, "A System and Method for Creating an Object Oriented Transaction Service that Interoperates with Procedural Transaction Coordinators," filed Oct. 11, 1994 and bearing application Ser. No. 08/320,357.

BACKGROUND OF THE INVENTION

1. Field of the Invention

The present invention relates to computer implemented processes and apparatus for functionally enhancing software. Still more particularly, it relates to the use of object oriented programming techniques and objects to enhance procedural program code.

2. Background and Related Art

The functional enhancement of software has been a difficult problem as long as software has been developed. Enhancement of systems software such as an operating system or transaction processing system is even more difficult than enhancing application software. Systems software is typically complex with many interrelationships that must be preserved through any modification.

Object oriented programming techniques have been introduced to combat the problem of complexity in systems and application software. "Objects" encapsulate the behavior (methods or process) of an application and the data used by that application. Each object in the system contains both data and process code. Manipulation of object data can occur only by invocation of an object method.

Object oriented programs can be functionally enhanced by adding new objects that build on existing objects by adding or replacing function. New objects can inherit methods from existing function and by "overriding" the inherited methods, can change the function of the object.

Procedural languages, which make up the bulk of existing operating systems and application systems, are not as easily modified. Since the data and procedures have not been encapsulated, it is frequently difficult to ensure that all needed code locations have been changed and that the changes will not have an adverse impact on another section of the system.

Thus, the technical problem to be solved is to be able to apply object oriented programming techniques to procedural code in such a way that procedural code can be functionally enhanced without modifying the procedural code or the applications that use it.

SUMMARY OF THE INVENTION

The present invention is directed to a system and method for using object oriented programming methods to enhance the function of procedural software and, in particular, procedural system software.

The present invention is directed to a system for enhancing systems software, the system comprising: means for interfacing to the systems software, the means for interfacing including a format for interacting with the systems software; object means responsive to an application program, the object means connected to the systems software by the means for interfacing; and enhancement means for adding systems software enhancement, the enhancement means connected to the object means and to the means for interfacing.

Thus, it is an object of the invention to provide a system for functionally enhancing software without directly accessing or changing the procedural software source code.

It is yet another object of the invention to provide a framework to extend a transaction manager to support nested transactions without modifying the underlying flat model procedural transaction manager.

The foregoing and other objects, features and advantages of the invention will be apparent from the following more particular description of a preferred embodiment of the invention, as illustrated in the accompanying drawing wherein like reference numbers represent like parts of the invention.

BRIEF DESCRIPTION OF THE DRAWING

FIG. 8 is an object diagram depicting the relationship of objects according to the present invention.

FIG. 10 is an example of an interface defintion according to the present invention.

DETAILED DESCRIPTION

The development of computer software has evolved from an activity that operated at the basic instruction level of the computer hardware to an activity that operates at much higher levels of abstraction. Computer programming languages have evolved from machine language, through first, second, third and fourth generation languages. Throughout this evolution, however, the problem of performing efficient software maintenance, the process of correcting errors and adding function, has remained. Most software, particularly systems software such as operating systems and transaction processing systems, contains complicated internal interrelationships that must be preserved through any maintenance activity. Software that has undergone maintenance may eventually become so intertwined with logic that it is difficult for even a highly experienced developer to understand the interrelationships. Software maintenance is also frequently prevented in commercial packages where only binary executable versions of the software are distributed.

Object oriented programming and object oriented systems design have evolved to address the complexities of software development. Interrelationships between software elements (or objects) are strictly controlled. Object oriented programming systems are designed to increase the efficiency of program development by enabling object reuse and simplifying system maintenance through clear separation of function. Each object in an object oriented system encapsulates the data for that object and the procedures or methods for operating on that data. Encapsulation means that the data for an object can be manipulated only by that object using the defined methods. Object oriented systems also implement object inheritance. Inheritance allows a more specific object to be derived from a general object. The more specific object can "inherit" all of the data and methods of the parent object, but can override selected data and methods and add others to implement its unique function.

Object oriented programs thus become much easier to maintain than traditional procedural programs. This improvement in technology, however, does not solve the maintenance problems for the huge store of existing procedural code. Migration of this code base (frequently termed "legacy code") to object technology may take a decade or more, if it is done at all.

The present invention addresses the problem of maintaining procedural software by presenting a novel design for applying object oriented solutions to legacy code maintenance and, in particular, to the problem of enhancing the function of systems software code.

Figure 1:
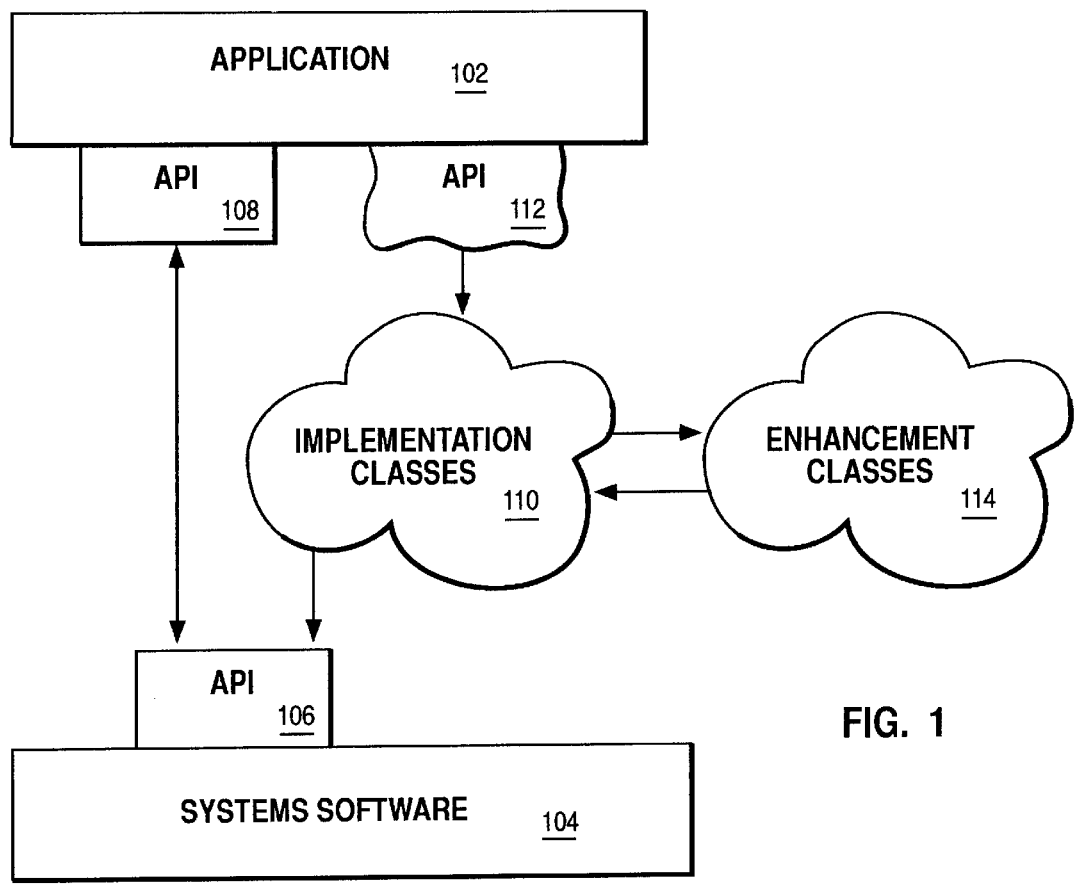
FIG. 1 is a block diagram of a system according to the present invention.

FIG. 1 illustrates a software system according to the present invention. Existing software applications 102 access system software 104 through defined application programming interfaces (APIs) 106 108. The system software application programming interface defines the functions that the software will provide and specifies the information that must be sent to execute that function. The present invention adds object oriented implementation classes 110 and an object oriented API 112 to the system. The implementation classes map the application API 112 to the low level system software API 106. The classes and methods of the mapping encapsulate the system software function. The lowest level methods invoke the procedural API 106 to carry out the functions requested by the higher level application API 112.

The introduction of an object oriented interface and object classes provides an opportunity to extend the application API 112 using object oriented techniques. Enhancement classes 114 can be added to the system to provide added function without changing the lower level system software API 106. The implementation classes 110 provide the encapsulated low level interface to the system software APIs.

Enhancement classes 114 are a collection of additional implementation classes that can either override or sub-class existing implementation classes at run time in their binary representation. These enhancement classes represent discrete units of function for a specific transaction and permit easy replacement to support a specific application without unwarranted impact on other applications using the unenhanced system software. This is achieved as follows.

Class definitions are created that permit objects to be created for a specific action or transaction rather than for a set of actions or transactions; this allows unique behavior to be introduced on a per-action or per-transaction basis.

Functions are decomposed to very low levels; this provides maximum flexibility in the granules of function which must be replaced by substitution while retaining the remaining function through inheritance.

The present invention enables creation of fine grain objects that can be more effectively reused by other applications than would have been possible in the absence of this invention.

The general solution presented above will be explained in greater detail through an example of extending the function of a procedural transaction manager. The example shows how an ability to process nested transactions can be added to a transaction manager designed to support only flat transactions.

The application of object oriented techniques to transaction processing systems raises many new issues but offers opportunities to increase system efficiency through the use of object oriented principles. The Object Management Group, Inc. (OMG) has established standards for interoperable object oriented systems. The overall architecture defined by OMG is the Common Object Request Broker Architecture (CORBA). CORBA defines the interactions between objects, and in particular, between distributed objects in different computer systems. OMG has accepted a specification to standardize transaction processing in object oriented systems. This specification, entitled the *Object Transaction Service (OTS) Specification*, sets forth the requirements for object services necessary to implement a transaction processing system. The OTS specification uses many of the unique capabilities of object oriented systems.

Figure 2:
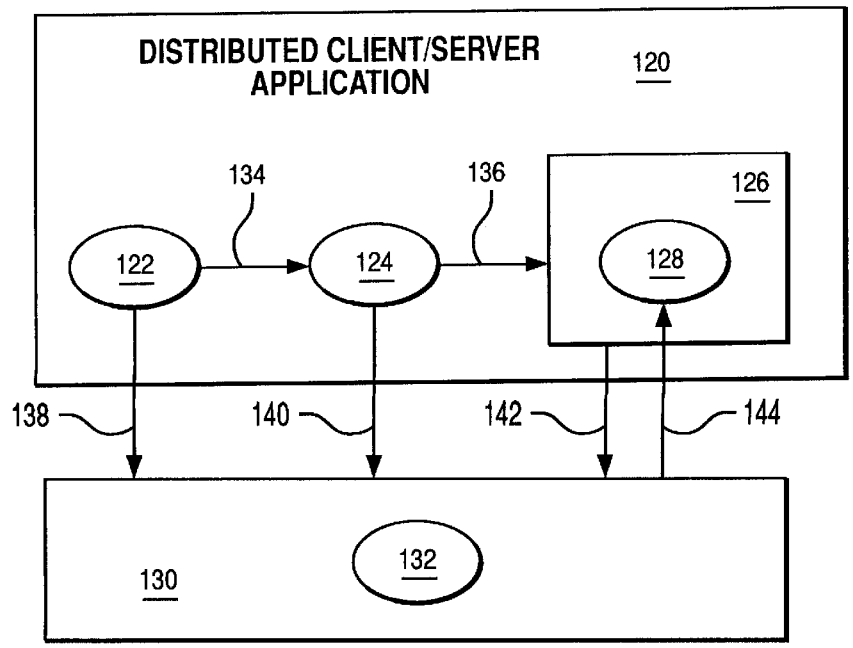
FIG. 2 is a block diagram illustraing the components of an OMG Object Transaction Service transaction processing environment.

The Object Transaction Service model defined by the Object Management Group is shown generally in FIG. 2. A distributed client/server (C/S) application is shown at 120. The application 120 comprises a number of objects that exchange messages to accomplish the actions required by the transaction. The objects present in the application include one or more Transactional Clients 122 that invoke operations of transactional objects. The object that begins a transaction is the transaction originator and the originator sends a message 138 to the Transactional Service at the beginning and end of a transaction. A transactional object is an object whose behavior is affected by being invoked within the scope of a transaction. A transactional object typically contains or refers to persistent data that can be modified by transactional requests. Persistent data is that data that will survive a system restart. Persistent data typically resides on disk storage devices, non-volatile memory or similar devices.

Transactional objects are used to implement two types of application servers: a transactional server 124 and a recoverable server 126. A recoverable server implements protocols necessary to respond to a transactional server and ensure that all participants in the transaction agree on the outcome, either to commit the transaction or roll-back the transaction, and to be able to recover from failure. A recoverable object is a transactional object, but not all transactional objects are recoverable. Non-recoverable transactional objects may implement their state using some other recoverable object.

A recoverable object must participate in Transaction Service 130 protocols. Transaction Service 130 maintain certain data defining the scope of each transaction as transaction context 132. A transaction context 132 is associated with each ORB-aware thread (Object Request Broker (ORB) characteristics are defined by the OMG CORBA architecture.) The transaction context 132 is submitted with each request generated from the client application and is used to define operational environment characteristics where the request is processed. Contents of the transaction context 132 can include a reference to the transaction coordinator, ancestor references for nested transactions, a globally unique transaction id for the transaction coordinator and implementation specific data understood by the subordinate transaction coordinator.

Recoverable objects participate in Transactional Service 130 by registering a Resource 128 with the Transaction Service. The Transaction Service 130 drives the commit protocol (the two phase commit) by contacting those resources registered for a transaction.

A transactional server 124 is a collection of one or more objects whose behavior is affected by the transaction but have no recoverable states of their own. A transactional server implements transactional changes using other recoverable objects. A transactional server does not participate in the completion of the transaction but can force the transaction to be rolled back by sending a roll back message 140.

A recoverable server 126 is a collection of objects, at least one of which is recoverable. A recoverable server participates in the protocols by registering one or more Resource objects 128 with the Transaction Service using a Registration message 142. The Transaction Service drives the commit protocol by issuing requests 144 to the resources registered for a transaction.

Figure 3:
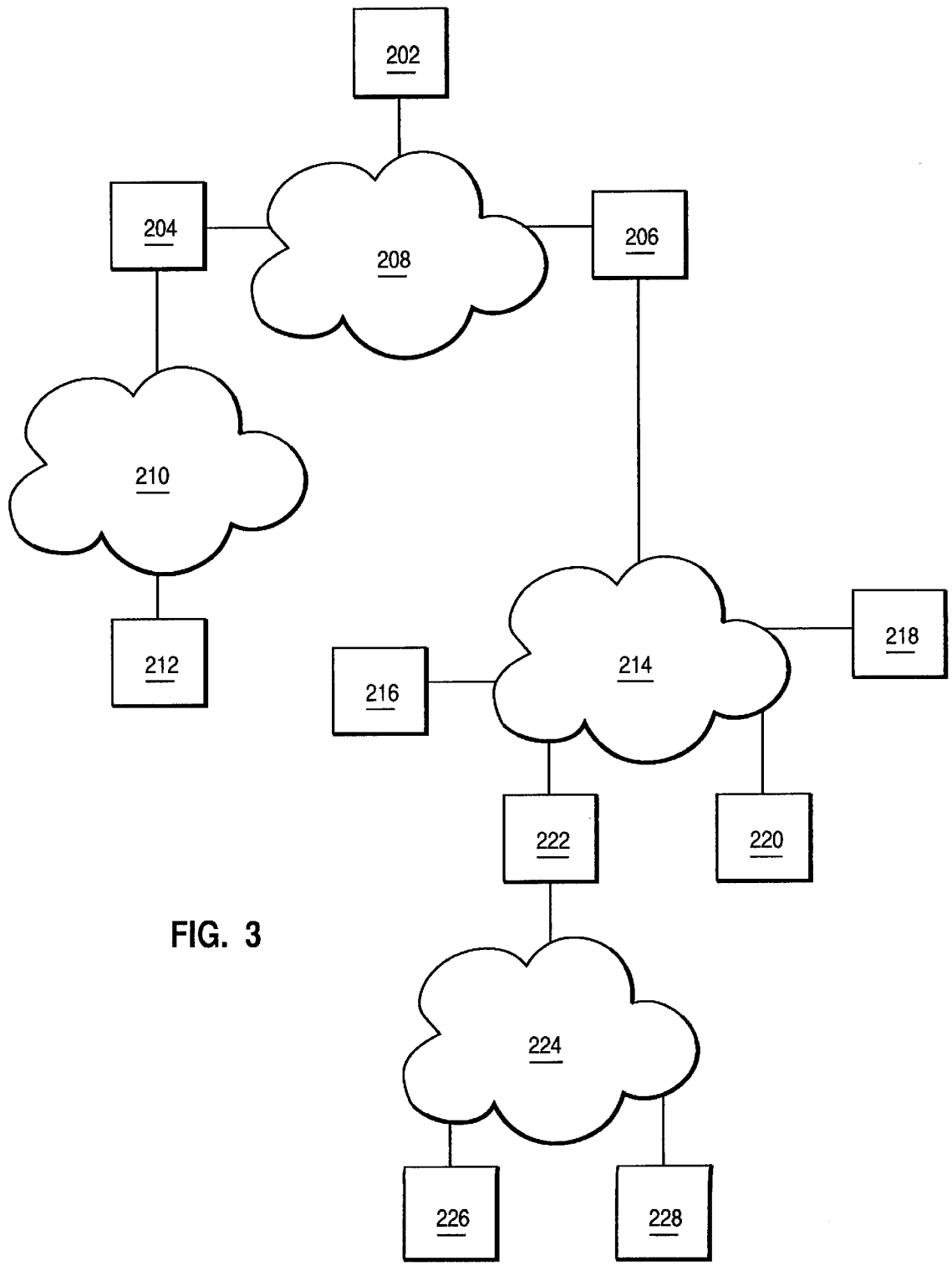
FIG. 3 is a block diagram illustrating a distributed computer system in which the present invention is practiced.

An example of a distributed processing system according to the present invention is shown generally in FIG. 3. Several computer systems are interconnecting using communication networks. For example, systems 212 and 204 are connected by network 210. Systems 204, 202, and 206 by network 208. Systems 206, 216, 218, 220, and 222 by network 214 and systems 222, 226, and 228 by network 224. The networks can be any known local area network (LAN) or wide area network (WAN), including token ring, Ethernet or other network. The "network" can also be the communication bus between multiple processes in a single computer system.

Figure 4:
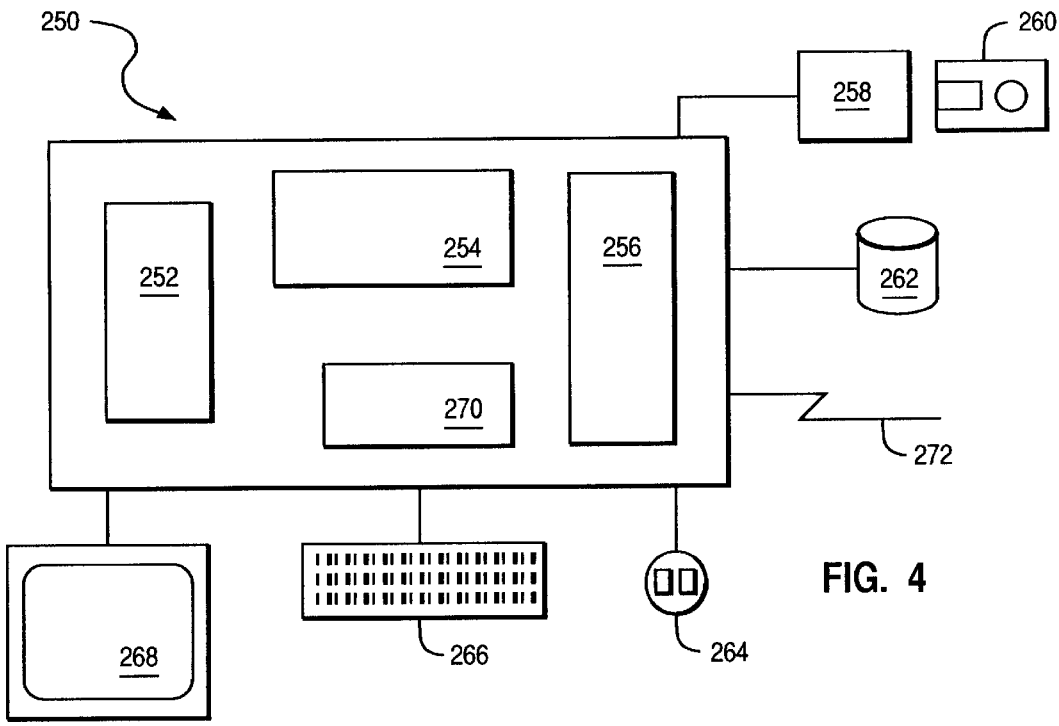
FIG. 4 is a block diagram of a computer system on which the present invention is practiced.
Figure 5:
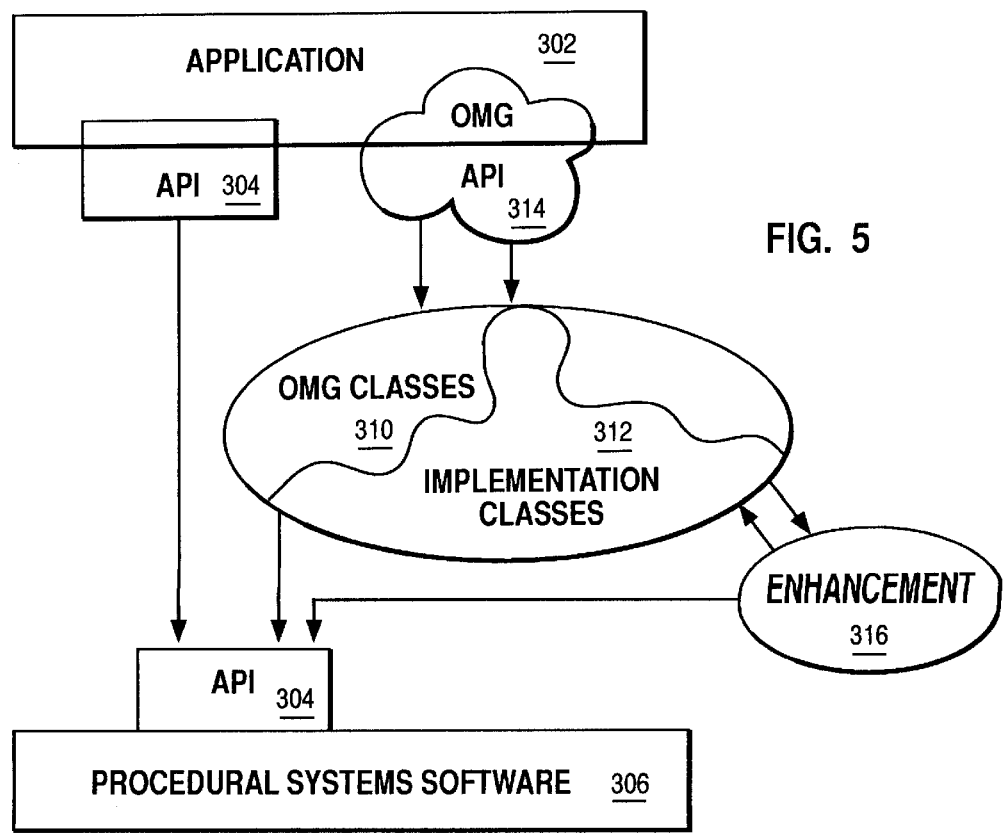
FIG. 5 is a block diagram illustrating one embodiment of the present invention.

A typical computer system is shown in FIG. 4. Each system 250 contains one or more central processing units 252, volatile memory 254, and input/output controller 256. The input/output controller 256 manages writing to magnetic or optical disk storage 262, removable storage 258, 260 and to display 268, keyboard 266 and pointing device 264. System communication controller 270 manages communications with a network via communication link 272. This configuration is provided for exemplary purposes only and is not intended to be limiting. A commercially available computer system such as the IBM PS/2 computer or IBM RISC System/6000 workstation are examples of the types of systems on which the invention may be practiced. (PS/2 and RISC System/6000 are trademarks of the IBM Corporation.) As discussed above, the systems of a distributed environment may all be linked via a single communications bus sharing memory and disk storage.

Computer system 250 is controlled by an operating system such as the OS/2 operating system, or the AIX operating system (OS/2 and AIX are trademarks of the IBM Corporation.) Network communications may be managed by a network operating system such as Novell Netware operating system, or the IBM LAN Server operating system (Netware is a trademark of the Novell Corp.)

The present invention is practiced using a program in computer memory or suitable hardware to control a computer system such as those described above.

An object oriented application 120 performs transaction operations using the objects and classes defined by the OMG Object Transaction Service model. These classes provide an object oriented interface or API into the OMG OTS.

Figure 6:
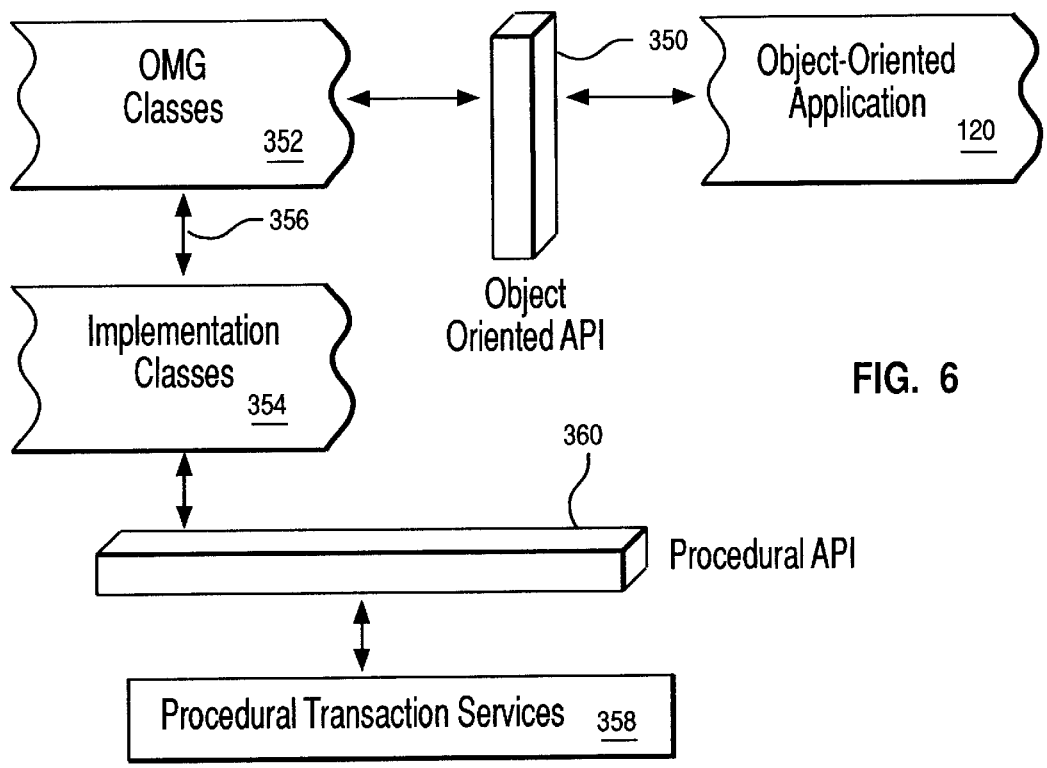
FIG. 6 is a block diagram illustrating the programming interfaces used in the present invention.

The design of the implementation classes defining "implementation objects" that allow the object oriented OTS to operate with a procedural transaction manager must be done carefully to avoid conflicts and inconsistencies that could prevent interoperation. Before describing the specific aspects of the implementation classes used to extend the function of a procedural transaction manager, a general description of the relationship of the implementation classes to other transaction services must be described. This relationship is detailed in U.S. patent application Ser. No. 08/320,357. The relationship of implementation classes to procedural transaction services and OMG OTS classes is shown in FIG. 6. An object oriented application 120, as discussed above, accesses OMG Object Transaction Service through an object oriented API 350. This API is, in fact, the API specified by OMG for the Object Transaction Service and is provided and implemented by the OMG defined classes 352. Implementation classes 354 of the present invention bridge OMG classes 352 to the procedural transaction services 358. The implementation classes 354 have defined object oriented interfaces 356 that are used by the OMG classes 352. Implementation classes 354 communicate through a selected set of transaction manager procedural APIs 360 to the procedural transaction services 358. This novel implementation preserves the standard OMG interface and the OMG class implementations. The implementation classes 354 encapsulate the object to procedural transaction manager interface.

Objects in an object oriented software system perform operations on object data using object methods. An operation is requested by sending a message to a selected object requesting performance of a method. For example, the OMG OTS specifies that a new transaction is started by sending a BEGIN() message to the CURRENT object. (This is represented in shorter form as: CURRENT::BEGIN().) Any required parameters must be provided within the parentheses. This message will cause the 'BEGIN' method of the object 'CURRENT' to be invoked. The set of objects and methods defines the object oriented interface or API.

Figure 7:
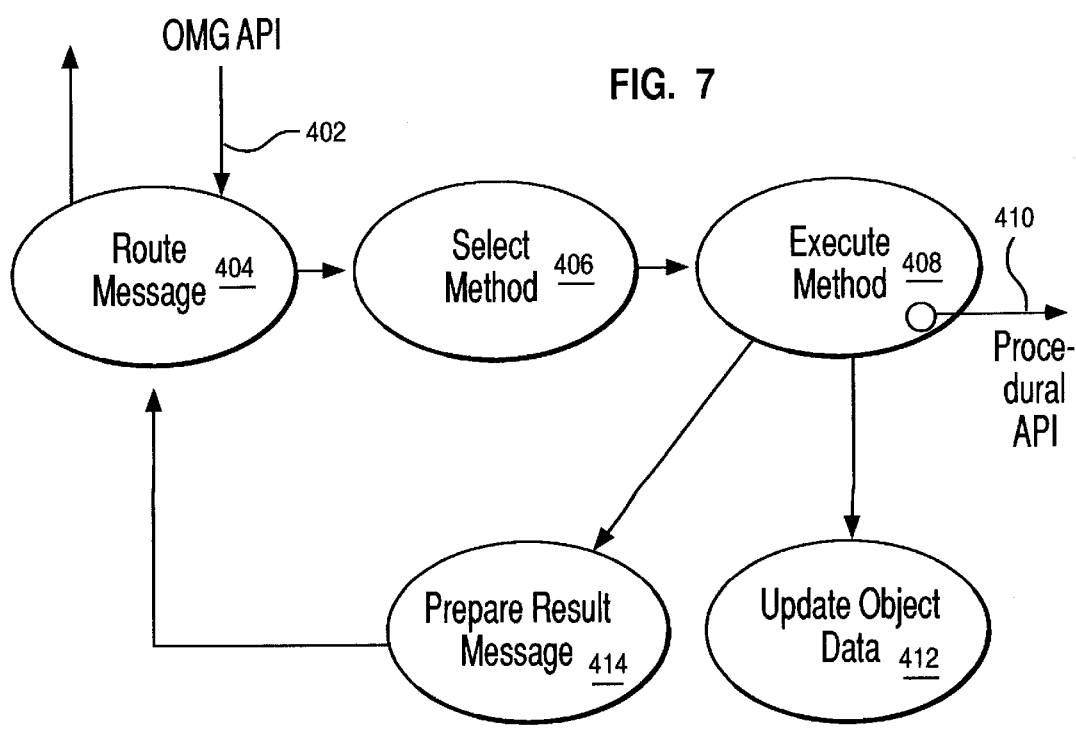
FIG. 7 is a flow diagram depicting the transformation of an object invocation to a procedural API call.

An object method can invoke other object methods or can carry out a function using functional code that is essentially procedural code. The flow of control in an object oriented system is illustrated in FIG. 7. A message 402 is sent by an application program. The object oriented system routes 404 the message to an appropriate object for method selection using known object oriented system techniques. The requested method is selected 406 and executed 408. The present invention includes the necessary procedural transaction statements in an object method. The procedural statement invokes a procedural API 410 requesting the necessary transaction processing. Results returned from the procedural call may be used to update the object's data 412 or may be included in a message 414 to another object requesting a change to its data or other action based on the results. This new message is routed using the message routing process 404.

An example of the application of the system and method of the present invention is the addition of nested transaction processing to a system based on a transaction manager that supports only flat transactions. A flat transaction model is one in which each transaction is independent of other transactions. A flat transaction is started and completed as a unit. A nested transaction model provides for a hierarchy of transactions. The top level root transaction can have many "child" transactions. Each child transaction is processed as a single atomic unit. However, the changes made by all children under the root transaction are not committed until all children and the root successfully complete processing.

A nested transaction system must, therefore, have the ability to monitor the hierarchy of transactions and test for completion of the children transactions before committing the root transaction. In addition, each child transaction must check for completion of processing of its children.

Enhancement of a flat transaction model transaction manager to handle nested transactions is shown generally in FIG.

5. An application 302 uses procedural API 304 to call procedural system software 306 via API 304. The application or a new application is also able to use the OMG API 314 that, via implementation classes 312 invokes the procedural transaction manager through API 304. The implementation classes provide the logic necessary to transform a method invocation using the OMG API into the necessary procedural calls to a procedural transaction manager, e.g. the TRAN transaction manager from the Transarc Encina product. The OMG API provides an interface definition for nested transactions, but provides no implementation logic. A few transaction managers, such as TRAN mentioned above, support nested transactions. When TRAN is used, a normal set of implementation classes can be developed to transform the object invocation of nested transaction functions into procedural calls. If a different procedural transaction manager is used, however, this approach will not work.

The present invention provides a novel system and process for adding function to system software in the form of a set of enhancement classes 316. Nested transaction processing function can be added in the form of enhancement classes 316. These classes include the logic to support nested transactions when the underlying transaction manager does not. The enhancement classes provide an ability to add finer grained objects that can be more effectively reused by other applications than would have been possible in the absence of this invention.

The OMG OTS specification defines the following interfaces: Current, Factory, Control, Terminator, Coordinator, RecoveryCoordinator, Resource, SubtransactionAwareResource, and TransactionalObject. The application that originates a transaction (the "transaction originator") uses the Current or the Factory interface to start a transaction which then provides a Control object. The Control contains information unique to an individual transaction and provides access to a Coordinator and a Terminator. The Coordinator is made available to Resources accessed for the transaction and also manages the two phase commit processing for the transaction. The Terminator is used by the transaction originator to either commit (make the changes permanent) or rollback (return to the earlier state) the actions taken for a transaction.

The OTS design envisions that a typical transaction originator will use the Current interface to begin a transaction and will then issue a series of transaction requests, some of the transaction requests involving transactional objects. If a transactional object has persistent data that must be managed as part of the transaction, the Coordinator is used to register a Resource. The Resource represents the object's participation in the transaction. The Coordinator uses the Resource to perform the two phase commit protocol. The protocol is initiated by the transaction originator issuing a commit or rollback operation through the Current interface.

The preferred embodiment implements OMG Object Transaction Service through implementation classes. The implementation classes link the functions defined through the OMG interfaces to existing procedural transaction coordinators running on existing systems. These classes provide a replaceable bridge between the OMG based classes and the actual procedural code running on a system. The implementation class methods include code necessary to call the procedural interfaces available from the existing transaction coordinators. In addition, some of the key procedural transaction functions must be intercepted and the data from them provided to the implementation classes. This is done primarily in the area of tracking Resources involved in a transaction. The RegisteredResources are the base for determining who must be sent messages to Prepare, Commit or Rollback during transaction completion or recovery.

Nested transaction support can be added to the above transaction as follows. The OMG defined Coordinator includes a method to create nested transactions: Coordinator::create_subtransaction. (The preceding term indicates that the "create_subtransaction" method of the "Coordinator" object will be invoked.) The create_subtransaction method is an optional part of the OMG specification and includes no implementation logic. This invocation is used to begin a nested transaction.

The preferred embodiment overrides the Coordinator class with an ICoordinator class. The ICoordinator class provides the specific implementation of coordinator function. It is derived from the OMG specification and is not considered an implementation class as defined above.

The preferred embodiment of the present invention creates an implementation class INestingAwareCoordinator 504 that overrides the ICoordinator class 502 (see FIG. 8.) This new implementation class can be used to add to the procedural base the function for creating subtransactions. The following ICoordinator methods are overridden to provide nested transaction creation support:

create_subtransaction is modified to use a new class, the SubtransactionCoordinator instead of the standard OMG Coordinator;

prepare is modified to check for outstanding children and vote for rollback if there are any that have not completed; if all children have completed their transactions, prepare proceeds with normal two phase commit processing;

rollback is modified to ensure that all of the children of the INestingAwareCoordinator are rolled back before any of the participants in the top level transaction.

The SubtransactionAwareCoordinator 506, also derived from the OMG Coordinator, is created by the INestingAwareCoordinator and encapsulates all of the logic necessary to manage nested transactions.

The implementation class methods invoke procedural functions to initiate, prepare, commit and rollback transactions. Each of the transactions are independent and are unaware of special relationships, i.e. nesting, with any other transaction (e.g. parent, child, sibling.) Parents and children use exactly the same flat model procedural code in the underlying procedural system software.

This class structure maintains the nesting information and ensures correct ordering of operations during transaction completion. Because all of the nesting information is encapsulated within the new implementation classes, a procedural transaction manager that supports only flat, atomic transactions can be used as the core transaction service. Neither the procedural code or the OMG compliant code needs be changed to support nested transactions.

Figure 9:
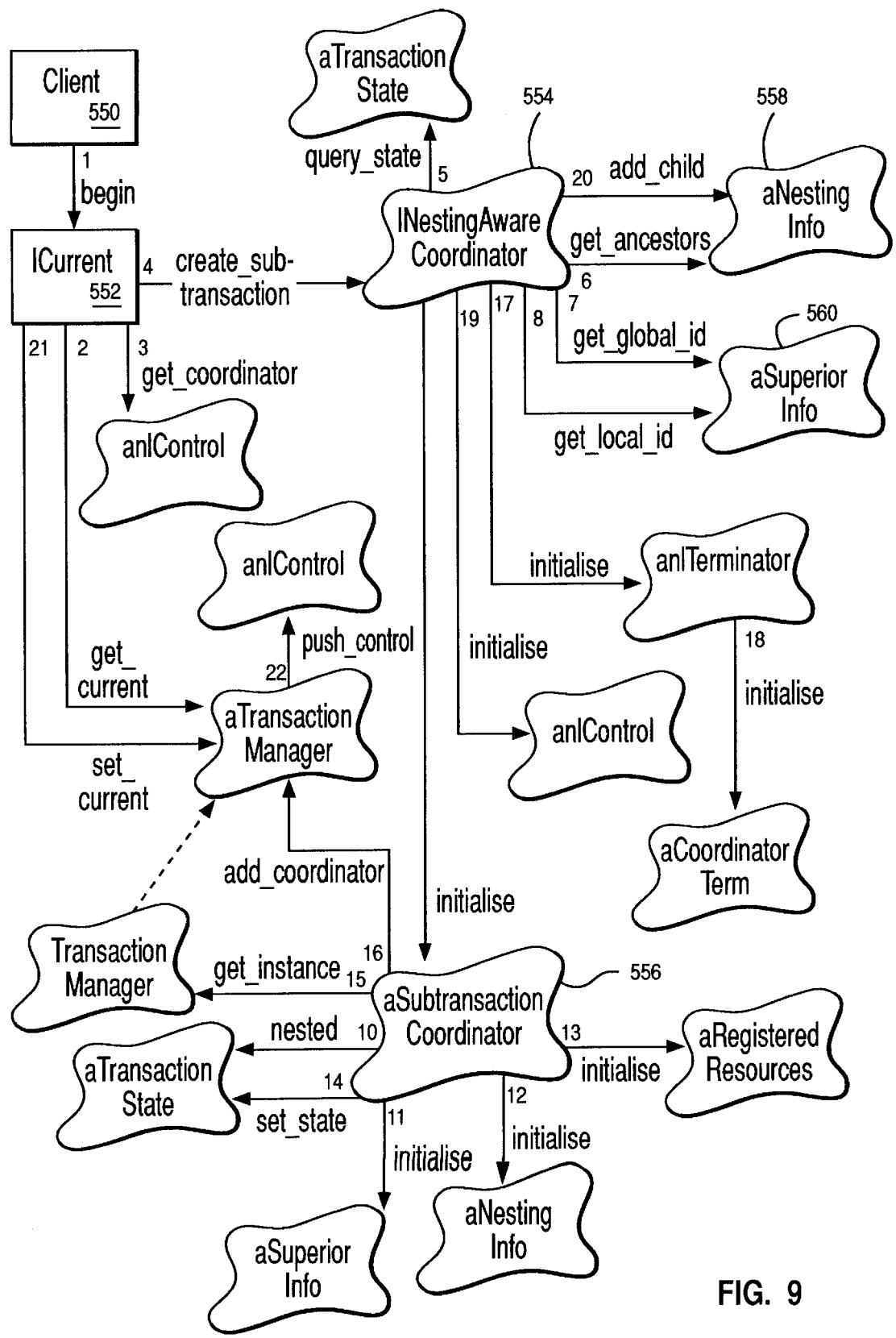
FIG. 9 is an object diagram depicting one embodiment of the present invention.

A more detailed description of the process of creating a nested transaction follows with reference to FIG. 9. A client application 550 issues a lCurrent::begin message to start a new transaction. ICurrent 552 tests to determine whether or not a transaction is active in the current thread of execution. If none are active, ICurrent will create a new top level transaction. If an existing transaction is found, ICurrent must create a subtransaction. A subtransaction is created by invoking ICoordinator::create_subtransaction which is overridden by the INestingAwareCoordinator::create_subtransaction method. If the INestingAwareCoordinator 554 does not wish to support nested transactions, a SubtransactionsUnavailable exception is raised.

If a subtransaction is to be created, the INestingAwareCoordinator obtains ancestor and superior identification information from the objects aNestingInfo 558 and aSuperiorInfo 560. It then initializes the subtransaction environment by invoking SubtransactionCoordinator::initialise. The initialise method creates and initializes a SubCoordinator given the parent transaction InternalTransactionID and OMGTransactionID and the sequence of ancestors and returns an OMGTransactionID that identifies the subtransaction. The initialise method then invokes existing methods to establish a transaction environment, viz. TransactionState::TransactionState_nested, SuperiorInfo::initialise, NestingInfo::initialise, TransactionState::set_state, TransactionManager::get_instance, TransactionManager::add_coordinator. The methods RegisteredResources:RegisteredResources_initialise and *RegisteredSyncs::new are not invoked until those objects are required.

The interface definition for the SubCoordinator class is provided in FIG. 10. This definition identifies three methods unique to the SubCoordinator: SubCoordinator_initialise, SubCoordinator_subordinate, and SubCoordinator_construct. Existing methods overridden by the SubCoordinator class are also listed.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

We claim:

1. A computer implemented system for functionally enhancing procedural transaction management systems software, the system comprising:
   means for interfacing to said systems software, said means for interfacing including a format for interacting with said systems software;
   object means responsive to an application program, said object means connected to said systems software by said means for interfacing; and
   enhancement means for adding nested transaction management systems software function to flat transaction model procedural transaction management system software without modifying said procedural transaction management system software, said enhancement means connected to said object means and to said means for interfacing and including a plurality of objects distinct from said object means encapsulating new systems software function and data.

2. The system of claim 1, wherein said object means includes a plurality of implementation classes responsive to object method invocation messages and generating procedural invocations of said systems software through said means for interfacing.

3. The system of claim 1, wherein said means for interfacing is a procedural application programming interface (API).

4. The system of claim 1, wherein said enhancement means includes a class for managing nested transactions, said class incorporating a set of computer implemented process logic for ensuring that a nested transaction hierarchy complete only after evaluating the completion of transactions at lower levels of the hierarchy said class invoking flat transaction model services of said procedural system software.

5. A computer implemented process for functionally enhancing software, the software having a procedural application interface, the process including the steps of:
   constructing object interface classes containing object methods responsive to object method invocation and containing means to invoke said software using said procedural application interface; and
   constructing systems software enhancement classes that provide new systems software function extending a function of said procedural software with using the unchanged procedural application interface to invoke procedural software services to support said new systems software function, said systems software enhancement classes being distinct from said object interface classes invoking said object methods.

6. The process of claim 5, wherein said software is transaction processing software, said procedural application interface is a flat transaction interface, and said new function is nested transaction management supported by said flat model transaction management system.

7. The process of claim 6, wherein said step of constructing software enhancement classes includes the steps of:
   adding a coordinator class that overrides the base coordinator and contains program logic for initializing a nested transaction;
   adding program logic to said coordinator class to test for the completion of lower level transaction completion prior to completing higher level transactions said test including testing transaction completion in said flat model transaction management system.

8. A computer program product having a computer readable medium having computer program logic recorded thereon for functionally enhancing procedural systems software having defined function and a plurality of defined system software interfaces, said computer program product comprising:
   program product means for causing a computer system to access a defined interface to said procedural systems software, said program product means including a format for interacting with said procedural systems software;
   program product means for causing a computer system to invoke systems software in response to an application program object oriented method invocation, said program product means accessing said systems software using said program product means for interfacing;
   program product enhancement means for causing a computer system to add new systems software function to said procedural system software without changing the plurality of defined interfaces, said program product enhancement means responsive to said program product means and to said program product means for interfacing, said program product enhancement means invoking functions of said procedural system software means to support a part of said new systems software function.

9. The program product of claim 8, wherein said program product means includes a plurality of implementation classes responsive to said object method invocation messages and generating procedural invocations of said systems software through said program product means for interfacing.

10. The program product of claim 8, wherein said program product means for interfacing is a procedural application programming interface (API).

11. The program product of claim 10, wherein said procedural systems software is a flat model transaction management system.

12. The program product of claim 11, wherein said program product enhancement means includes a class for managing nested transactions using said flat model transaction processing system, said class incorporating a set of computer implemented process logic for ensuring that a nested transaction hierarchy complete only after evaluating the completion of transactions at lower levels of the hierarchy, said process logic for evaluating including tests for completion of transactions in said procedural system software.

* * * * *